United States Patent
Niekamp

(10) Patent No.: US 11,557,942 B2
(45) Date of Patent: Jan. 17, 2023

(54) ACTUATOR DEVICE FOR ADJUSTING AN ADJUSTING ELEMENT, DRIVE CIRCUIT FOR AN ACTUATOR, MANUFACTURING METHOD FOR PRODUCING A DRIVE CIRCUIT

(71) Applicant: Mahle International GmbH, Stuttgart (DE)

(72) Inventor: Peer Niekamp, Leutenbach (DE)

(73) Assignee: Mahle International GmbH

( * ) Notice: Subject to any disclaimer, the term of this patent is extended or adjusted under 35 U.S.C. 154(b) by 279 days.

(21) Appl. No.: 16/831,787

(22) Filed: Mar. 26, 2020

(65) Prior Publication Data
US 2020/0313522 A1 Oct. 1, 2020

(30) Foreign Application Priority Data
Mar. 27, 2019 (DE) .......................... 102019204290.2

(51) Int. Cl.
*H02K 11/40* (2016.01)
*H02K 11/33* (2016.01)
(Continued)

(52) U.S. Cl.
CPC ............... *H02K 11/40* (2016.01); *H02K 5/08* (2013.01); *H02K 5/225* (2013.01); *H02K 7/116* (2013.01);
(Continued)

(58) Field of Classification Search
CPC .......... H02K 11/40; H02K 5/08; H02K 5/225; H02K 7/116; H02K 9/22; H02K 11/33; H02K 15/14; H02K 9/227; H02K 11/02
(Continued)

(56) References Cited

U.S. PATENT DOCUMENTS

| 7,687,947 | B2 | 3/2010 | Urbach et al. |
| 2005/0088054 | A1* | 4/2005 | Hartel ................ F04B 53/22 310/239 |

(Continued)

FOREIGN PATENT DOCUMENTS

| CN | 1879217 A | 12/2006 |
| CN | 108093666 A | 5/2018 |

(Continued)

OTHER PUBLICATIONS

Chinese Office Action dated Mar. 4, 2022 for copending Chinese Appl. No. 202010227521.6 (with English translation).

(Continued)

*Primary Examiner* — John K Kim
(74) *Attorney, Agent, or Firm* — Fishman Stewart PLLC

(57) ABSTRACT

An actuator device for adjusting an adjusting element may include a housing, an actuator for driving the adjusting element, and a drive circuit for operating the actuator. The housing may include a support body that may include a drive receiving space and a gear receiving space. The drive circuit may include a plurality of electrically conductive conductor bodies for contacting a plurality of drive contacts of the actuator, for contacting a plurality of components of the drive circuit, and for contacting a supply device. At least one conductor body of the plurality of conductor bodies may be structured as a contact tongue, arranged on the drive circuit, and abut on an electrically conductive actuator housing in a pretensioned manner establishing an electrical contact between the drive circuit and the actuator housing. The actuator housing may be configured as at least one of a zero-ground potential and a reference potential.

23 Claims, 3 Drawing Sheets

(51) Int. Cl.
  *H02K 15/14* (2006.01)
  *H02K 5/08* (2006.01)
  *H02K 5/22* (2006.01)
  *H02K 7/116* (2006.01)
  *H02K 9/22* (2006.01)

(52) U.S. Cl.
  CPC ............ *H02K 9/227* (2021.01); *H02K 11/33* (2016.01); *H02K 15/14* (2013.01)

(58) Field of Classification Search
  USPC .............................................. 310/51, 64, 71
  See application file for complete search history.

(56) References Cited

U.S. PATENT DOCUMENTS

| | | | |
|---|---|---|---|
| 2005/0247528 A1 | 11/2005 | Schack et al. | |
| 2007/0170789 A1* | 7/2007 | Kawarai | H02K 11/026 310/71 |
| 2007/0283923 A1 | 12/2007 | Khelifati et al. | |
| 2015/0381016 A1* | 12/2015 | Tsuda | H02K 11/35 310/68 B |
| 2016/0126680 A1* | 5/2016 | Maeda | H02K 11/0094 439/620.21 |
| 2018/0241282 A1* | 8/2018 | Niekamp | F02M 35/10157 |
| 2020/0313522 A1* | 10/2020 | Niekamp | H02K 11/40 |

FOREIGN PATENT DOCUMENTS

| | | |
|---|---|---|
| DE | 102005043450 A1 | 3/2007 |
| DE | 10 2009 053 830 A1 | 5/2011 |
| DE | 202012013344 U1 | 6/2016 |
| DE | 10 2015 215 732 A1 | 2/2017 |
| EP | 1 865 173 A2 | 12/2007 |
| WO | WO-02/057124 | 7/2002 |
| WO | WO-2014/090953 | 6/2014 |

OTHER PUBLICATIONS

Chinese Search Report dated Feb. 28, 2022 for copending Chinese App. No. 202010227521.6 (with English translation).
English abstract for DE-10 2009 053 830.
English abstract for DE-202012013344.
English abstract for DE-102005043450.

* cited by examiner

ACTUATOR DEVICE FOR ADJUSTING AN ADJUSTING ELEMENT, DRIVE CIRCUIT FOR AN ACTUATOR, MANUFACTURING METHOD FOR PRODUCING A DRIVE CIRCUIT

CROSS-REFERENCE TO RELATED APPLICATIONS

This application claims priority to German Patent Application No. DE 10 2019 204 290.2, filed on Mar. 27, 2019, the contents of which are hereby incorporated by reference in their entirety.

TECHNICAL FIELD

The invention relates to an actuator device for adjusting an adjusting element, in particular for a motor vehicle. The invention furthermore relates to a drive circuit for an actuator of an actuator device for adjusting an adjusting element, in particular for a motor vehicle. The invention further relates to a manufacturing method for producing a drive circuit of an actuator device, in particular for a motor vehicle, as well as a motor vehicle component produced according to the method.

BACKGROUND

Actuator devices of the above-mentioned type serve the purpose of adjusting an adjusting element. The adjusting element is, for example, a valve, a wastegate valve, a variable turbine or compressor geometry, exhaust flaps, acoustic flaps or also windshield wipers. For this purpose, actuator devices usually have a housing, in which an actuator, usually an electrical motor, and an adjusting gear connected thereto are arranged. During operation of the actuator devices, a drive torque provided by the actuator can be transferred to the adjusting element via the adjusting gear. A drive circuit is usually provided to control the actuator. Said drive circuit comprises an interference suppression branch for reducing electromagnetic interferences caused by the actuator, and a sensor branch for detecting and monitoring drive parameters.

An actuator device of this type is known from DE 10 2009 053 830 A1, wherein an adjusting device for operating an adjusting element comprising an actuator and comprising a housing made of plastic for receiving the actuator as well as a power electronics for operating the actuator are described.

An adjusting device for adjusting an adjusting element, in particular for a motor vehicle, is known from DE 10 2015 215 732 A1.

An adjusting device for adjusting a flap in an internal combustion engine comprising a housing is described in EP 1 865 173 B1. A gear unit and a drive motor are arranged in the housing. For electrically connecting the drive motor and other electrical and electronic components, the adjusting device has a stamped grid, which has sections of conductor tracks, which are partially extrusion-coated with plastic in the cover.

An actuator comprising a metal housing, an electric motor, an adjusting element, a transfer mechanism adapting the movement of the electric motor to the adjusting element, and an electronic circuit for controlling the electric motor is known from WO 2014/090953 A2. A stamped grid, which has conductor tracks, which serve to contact a sensor and to contact the electric motor, is arranged in the actuator.

Electrical and/or electromagnetic interferences originating from the used actuator, e.g. an electric motor, usually occur during the operation of actuator device. Interferences of this type influence electrical components, which are arranged in the actuator device. Voltage signals, for example, are distorted or are superimposed with measurement noise, which may necessitate a relatively complex signal processing. This can also affect to surrounding/adjacent components/assembly groups, as well as interference-sensitive receiving devices, such as TV receivers, radios or mobile telephones. To reduce the described interferences, it is common to use so-called interference suppression circuits. In the case of the actuator device, so-called electromagnetic compatibility circuits are used in practice, which are also known as EMC circuit. An interference suppression of the drive circuit or of the actuator, respectively, is attained in any case by means of the EMC circuit.

For the desired interference suppression, however, interference suppression circuits require a voltage potential, which is referred to as zero-ground potential or reference potential and which is usually simply described in practice as ground contact or grounding.

In the case of circuits of this type, zero-ground potentials of this type are usually realized in that an additional ground conductor, for example a ground cable or a ground conductor track, is arranged inside the drive circuit. The ground conductor is routinely guided via a system connector plug to the outside, where a connection to a zero-ground potential can be established. The additional conductor body, however, necessitates an increase of the circuit complexity, even though fewer complex circuits would be desirable, for example from the aspect of the cost and development scale for the production of an actuator device of this type.

SUMMARY

The object of the invention thus lies in providing an improved actuator device.

In the case of the present invention, this problem is solved in particular by means of the subject matters of the independent claim(s). Advantageous embodiments are subject matter of the dependent claim(s).

A first basic idea of the invention is to forego a ground conductor, which is guided to the outside via the system connector plug. Instead, a zero-ground potential is used, which is already present inside the actuator device.

For the realization, an actuator device comprising an in particular multi-part housing is provided, which comprises a support body made of plastic material. The support body has a socket, which is formed integrally with the support body, for connection to a plug, a drive receiving space for receiving an actuator, and a gear receiving space for receiving an adjusting gear. A plug, which is in contact with the supply device, can be inserted, for example, into the socket. The receiving spaces of the support body can advantageously each be covered by a housing cover, which is not described in more detail. In any case, an actuator, preferably an electric motor, is arranged in the drive receiving space, and an adjusting gear is arranged in the gear receiving space. The adjusting gear is advantageously coupled to the actuator on the drive side and is coupled to the adjusting element on the output side, so as to convert a drive torque or a drive movement provided by the actuator during the operation of the actuator device to the demands of an adjusting element movement of the adjusting element. A drive circuit is further provided for the operation of the actuator. It comprises an inference suppression branch for reducing interferences and optionally a sensor branch for detecting drive parameters of the actuator, for example the rotational speed. The drive circuit furthermore has electrically conductive conductor bodies for contacting drive contacts of the actuator, for contacting components of the drive circuit, and for contacting the socket.

To be able to forego a ground conductor, which leads to the outside, the drive circuit is equipped with at least one conductor body, which is referred to as contact tongue. The contact tongue establishes an electrical contact between the drive circuit and an, in particular metallic, actuator housing of the actuator. For this purpose, the contact tongue is clamped against the actuator housing, in particular against the housing surface thereof, thus is pretensioned against it or abuts thereon under pretension, respectively. The clamping between the contact tongue and the actuator housing can be promoted, for example, by an elastic deformation of the contact tongue. In any case, the actuator housing serves as zero-ground potential or reference potential for the drive circuit.

This has the effect that an additional ground conductor can be foregone. Due to the missing ground conductor, the drive circuit becomes less complex from a structural aspect. The drive circuit can be made, for example, in a more compact and thus more space-saving manner. The used socket-plug pairing can further be designed to be more compact due to the missing ground conductor, namely with fewer contact pins. The production of the actuator device as a whole is thus slimmer and more cost-efficient.

A second basic idea of the invention, which can be realized independently of and in particular in addition or as an alternative to the above first basic idea, is to provide an improved actuator device, in that electrical and/or electromagnetic interferences are reduced. For this purpose, it is provided to optimize the conductor bodies of a drive circuit for an actuator of an actuator device with regard to the orientation thereof in space.

For this purpose, the drive circuit has an interference suppression branch, which has at least two conductor branches, for reducing interferences. The interference suppression branch is advantageously arranged between the supply device and drive contacts of the actuator, in particular interconnected between them.

It is also conceivable that the interference suppression branch is arranged between two conductor branches, which are directly connected to a supply device, which is not described in more detail, for electrically supplying the actuator and the drive contacts of the actuator.

In any case, the conductor branches are connected to the supply device, for example via a socket of the actuator device. The interference suppression branch advantageously and practically always comprises a pair of capacitors, which is arranged on contact points, for interference suppression of the actuator.

Each conductor branch comprises at least one conductor body, which advantageously extends along an imaginary longitudinal axis, preferably in the axial direction of an aligning direction arranged parallel to the longitudinal axis.

The interference suppression branch is divided into at least two imaginary conductor alignment sections, which are preferably aligned in the alignment direction. The conductor branches or the conductor bodies, respectively, extend through these sections.

A first conductor alignment section is advantageously arranged between the supply device or electrical connections of a supply device and the contact points of the capacitor pair.

A second conductor alignment section, which advantageously follows in the alignment direction, is arranged between the contact points of the capacitor pair and the drive contacts of the actuator.

To reduce electrical and/or electromagnetic interferences in the drive circuit, it is provided that the conductor branches arranged inside the first conductor alignment section run obliquely towards one another in the alignment direction.

It is further provided that the conductor branches of the second conductor alignment section run obliquely away from one another in the alignment direction, quasi move away from one another, and lead into the drive contacts of the actuator.

This has the surprising effect that electrical and/or electromagnetic interferences in the drive circuit are reduced. The drive circuit can thus be improved with regard to its electromagnetic compatibility, so that in particular measurements can be performed more accurately with a sensor branch and sensitive receiving devices outside of the actuator are not interfered with.

A further basic idea of the invention is to provide a manufacturing method for producing a drive circuit of an actuator device. The actuator device and the drive circuit can preferably have features according to the claims or according to the description. Several steps are provided as part of the manufacturing method:

1) inserting a stamped grid into the gear receiving space through a gear receiving opening of the gear receiving space, wherein the stamped grid has conductor bodies and connecting elements connecting said conductor bodies to one another, 2) placing the stamped grid onto a bottom-side equipping surface of the gear receiving space, wherein positioning recesses introduced into the conductor bodies engage with positioning pins arranged on the support body, so as to arrange the stamped grid at a predetermined position relative to the support body, and so as to fix the stamped grid transversely to and along a positioning pin longitudinal axis, 3) extrusion coating the drive circuit made from the stamped grid in a plastic injection molding process, wherein the drive circuit is covered completely or at least partially with plastic material, so that a portion of the drive circuit is arranged in the interior of the dividing wall of the support body, 4) equipping the stamped grid with electrical components, wherein the electrical components are held and fixed by holding devices arranged on the conductor bodies, 5) connecting the electrical components to the stamped grid by means of a substance-to-substance bond and cutting the connecting elements of the stamped grid via laser welding, wherein the laser welding beam passes through the gear receiving opening, 6) inserting and fastening the actuator and the adjusting gear in the drive receiving space or in the gear receiving space, respectively, wherein the contact tongue is elastically bent in response to the insertion of the actuator, and is pretensioned to an actuator housing of the actuator, so that the contact tongue carves into the actuator housing or scratches it open, so as to establish and/or to improve an electrical contact to the actuator housing.

The invention also comprises motor vehicle components, such as an actuator device or an actuator for motor vehicles, which are produced according to the above-described method steps.

It is further preferred when the contact tongue is a flat body, which is bent in a prong-like manner and which advantageously has two large surfaces oriented in opposite directions, a front surface, and two small surfaces oriented in opposite directions. Due to the prong-like bending of the contact tongue, the contact tongue advantageously towers above the remaining conductor bodies, it quasi protrudes away from the drive circuit. Due to the fact that the contact tongue is bent in a prong-like manner, a large surface of the flat body is advantageously oriented towards the actuator during the operation of the actuator device and is clamped to the actuator housing. In response to the assembly of the actuator in the actuator receptacle, the large surface acts quasi like a ramp in such a way that the actuator glides along the large surface. The actuator can thus glide, for example, towards a centering arrangement, which simplifies the assembly.

The contact tongue further has, in particular over its entire longitudinal body axis, a triangular, a rectangular or a polygonal cross section, based on its longitudinal body axis.

The contact tongue advantageously comprises a first and a second tongue segment. The second tongue segment can be arranged at an angle relative to the first tongue segment, can quasi be bent. A first angle of between 90° and 170°, in particular of 90°, 100°, 110°, 120°, 130°, 140°, 150°, 160° or 170° can in particular be formed between the first and the second tongue segment.

For the interference suppression of the actuator, the interference suppression branch comprises so-called electromagnetic compatibility circuits, which is also described below as EMC circuit or EMC.

It is preferred when the actuator housing of the actuator is metallic and electrically conductive. In this case, it is suitable as zero-ground potential or reference potential for the drive circuit, so that a link or connection of the control circuiting to a zero-ground potential, quasi a ground link, can be realized.

The contact tongue has in particular at least one groove edge, for forming grooves in, carving into or scratching open the housing surface. The groove edge scratches over the actuator housing, in particular in response to the assembly of the actuator, and establishes a metallic contact to the actuator housing, for example also when the actuator housing is coated or lacquered. This has the advantage that the electrical contact between the contact tongue and the actuator housing is improved.

The groove edge is advantageously oriented in the direction of the actuator and is clamped to a housing surface of the actuator housing. It is attained thereby that the groove edge is arranged on the actuator housing and that a metallic contact is always established between the contact tongue and the actuator housing.

The groove edge can cut into a housing surface of the actuator housing in any case, so as to establish an electrical contact between the contact tongue and the actuator housing. This has the effect that the connection to the zero-ground potential is free from interferences, such as, for example, interferences caused by transition resistances. This has the advantage that the interference suppression of the drive circuit can be realized relatively easily and with high quality.

The groove edge of the contact tongue is preferably embodied to be sharp or pointy in a knife-like manner. It can thus cut relatively easily into a housing surface of the actuator. This has the advantage that the connection to the zero-ground potential can be established even if the housing surface of the actuator has, for example, relatively thick coatings or adhesive labels.

It is possible that the contact tongue is clamped to the actuator housing in a flexible or and bendable manner and during the operation of the actuator device. The contact tongue can in particular clamp to the actuator housing in a spring-like manner. The flat body of the contact tongue is in particular an elastically deformable bending rod. This has the advantage that the contact tongue can compensate, for example, dimensional deviations of the actuator housing in the region of the clamping.

It is preferred when the contact tongue is arranged in an interference suppression branch of the drive circuit, so as to provide a zero-ground contact for the interference suppression or a reference potential for signal and operating voltages. The contact tongue can thus be arranged relatively close to the actuator, because the interference suppression branch is conveniently always arranged directly on the actuator. This has the advantage that the contact tongue can be produced in a relatively compact manner with regard to its structural dimensions.

The contact tongue can further contact the actuator housing in the region of DC motor brushes of the actuator. This also promotes the structural dimensions of the contact tongue, because the DC motor brushes are usually arranged relatively close to the interference suppression branch.

The drive circuit can be arranged completely or at least partially in the interior of a dividing wall of the support body, which separates the drive receiving space and the gear receiving space from one another. The drive circuit is thus fastened to the support body in a virtually non-releasable manner on the one hand and is protected against environmental influences on the other hand.

The drive circuit is advantageously made of a stamped grid arranged in the gear receiving space. The stamped grid comprises the conductor bodies and in particular the connecting elements connecting the conductor elements to one another. The stamped grid can be arranged in the interior of the dividing wall in a non-releasable manner by means of a plastic injection molding process. This has the advantage that other connecting means, such as connecting screws, can be forgone.

To connect the actuator to the drive circuit in a relatively uncomplicated manner, it can be provided that at least one contact tongue is arranged outside of the dividing wall. The contact tongue advantageously protrudes from the dividing wall in this case, for example into the drive receiving space. This has the advantage that the actuator can be inserted into the drive receiving space as part of the assembly, wherein the contact tongue and the actuator housing come into contact with one another virtually without further effort in such a way that the contact tongue abuts on the actuator housing in a clamping manner.

At least one connecting section of the drive circuit and an actuator-side drive supply section of the drive circuit, and one or several holding devices of the drive circuit for holding electrical components can further be arranged outside of the dividing wall. This has the effect that the connecting section, the drive supply section, and the holding devices can be accessed relatively easily, for example to equip the holding devices with electrical components.

The drive receiving space can also be referred to as actuator receiving space. The actuator could likewise be referred to as drive.

The drive supply section of the drive circuit can in particular have a pair of spring bodies for contacting the drive contacts of the actuator. Each spring body is thereby advantageously arranged integrally on a conductor body of the drive circuit. Each spring body can have one or several elastic spring protrusions for contacting the drive supply section. The spring protrusions are arranged on an, in particular annular spring body holder, for example in a web-like manner and advantageously protrude into an annular opening of the spring body holder.

It can be provided that the drive circuit arranged in the dividing wall or the stamped grid is arranged between a heat sink for cooling the actuator and the gear receiving space. It is also conceivable that the heat sink is arranged between the gear receiving space and the drive circuit or the stamped grid. A cooling of the actuator can be attained in any case by means of the heat sink during operation of the actuator device. It is in particular conceivable that the drive circuit is additionally cooled by means of the heat sink.

The conductor bodies of the drive circuit in particular have one or several integral holding devices for holding electrical components, wherein the holding devices each have a pair of holding bodies, which jointly supports and fixes an electrical component. Electrical components, for example capacitors, can thus be attached to a drive circuit blank, which is not yet equipped with electrical components, without necessitating further tools. This has the advantage that the production of the drive circuit is quicker and thus more cost-efficient.

Advantageously, one or, in the alternative, each holding body comprises a component receptacle for supporting a connecting section of an electrical component. The component receptacles each have a receiving opening for the guide-through of the connecting section, and a support bed for applying and fixing a connecting section. The support bed has in particular a C-shaped contour.

It can be provided that one or advantageously each holding body is bent in the direction of a gear receiving opening of the gear receiving space. The holding bodies thus point in the direction of the gear receiving opening, so that electrical components can be inserted into and positioned on the holding devices through the gear receiving opening. This has the advantage that the drive circuit can be equipped with electrical components, for example, by hand or by means of corresponding automation.

The drive circuit can be made of a stamped grid arranged in the gear receiving space. The stamped grid advantageously comprises the conductor bodies and the connecting elements connecting said conductor bodies to one another.

The stamped grid can in particular have several positioning recesses, with which positioning pins engage, which are arranged on the support body. The stamped grid can thus be arranged at a predetermined or predeterminable position relative to the support body, wherein the stamped grid is fixed transversely to and along a positioning pin longitudinal axis. On the one hand, the stamped grid can thus not slip relative to the support body. On the other hand, the positioning recesses and positioning pins ensure a high automation capacity of the production process, because the stamped grid is always arranged at the same position.

It can further be provided that the positioning pins are arranged at a bottom surface, which is limited by a jacket surface of the gear receiving space.

It is conceivable that one or several pairs of positioning recess and positioning pin each have a transition or interference fit, so as to fix and position the stamped grid.

In addition to mechanical components, such as the adjusting gear and the actuator, the actuator device has electrical and electronic components, so that the actuator device can also be referred to as an electromechanical actuator device.

The receiving spaces each have a receiving opening, through which the actuator or the adjusting gear can be inserted. The receiving openings can advantageously each be covered by means of a housing cover.

The socket can be arranged on the side of the actuator device, which faces the drive receiving space.

The contact tongue can contact the actuator housing on a centering arrangement or a centering section of the actuator. The centering section is, for example, a centering collar of the actuator for positioning and centering the actuator on the support body.

The centering collar is advantageously permeated, in particular axially, by an actuator shaft.

To fix the actuator arranged in the drive receiving space to the support body, the actuator can be pretensioned to the actuator housing by a spring arrangement, for example a wave spring, which is arranged in the drive receiving space. The spring arrangement is thereby supported on the actuator on the one hand and on a housing cover closing the drive receiving space on the other hand. It is attained thereby that the actuator is tensioned in the direction of the support body.

If it has elastic properties, the contact tongue can be pretensioned to the actuator housing. This has in particular the effect that the actuator housing is tensioned to the support body, in particular transversely to an actuator shaft of the actuator.

The interference suppression branch can have two or more conductor branches, which extend along a longitudinal axis. Each conductor branch comprises in particular at least one conductor body or is formed by the latter.

The interruption suppression branch is advantageously divided into at least two imaginary conductor alignment sections, which are lined up in a row in the direction of the longitudinal axis. The conductor branches extend, in particular completely, through these conductor alignment sections.

Conductor branches or conductor bodies arranged inside a first conductor alignment section can run obliquely towards one another in any case. The conductor branches or conductor bodies, which are arranged inside a second conductor alignment section following the first conductor alignment section, can further run obliquely away from one another and can in particular lead into the drive contacts of the actuator. Due to this orientation of the conductor branches or conductor bodies, a relatively favorable electromagnetic compatibility (EMC) of the drive circuit is attained. This has the advantage, for example, that a signal processing of sensor signals detected by means of sensors can be realized relatively easily.

A third conductor alignment section is advantageously arranged between the second conductor alignment section and drive contacts of the actuator in the direction of the longitudinal axis. The conductor branches are arranged parallel to one another and/or parallel to the longitudinal axis inside the third conductor alignment section.

It can be provided that at least two capacitor contact points, into which the conductor branches lead, each in an oblique manner based on the longitudinal axis, are arranged at or on an imaginary section boundary between the first and second conductor alignment section.

The conductor branches arranged inside the first conductor alignment section advantageously point in the direction of the capacitor contact points. The conductor branches arranged inside the second conductor alignment section in particular point away from the capacitor contact points in the direction of the actuator contact.

It is possible that the two conductor branches are arranged symmetrically to one another with respect to the longitudinal axis in at least one conductor alignment section. The electromagnetic compatibility (EMC) of the drive circuit is improved thereby.

The conductor branches arranged inside the first conductor alignment section each form an angle A of between 30° and 80°, in particular of 30°, 35°, 40°, 45°, 50°, 55°, 60°, 65°, 70°, 75°, 80° between them and the longitudinal axis. The conductor branches arranged inside the second conductor alignment section further each form an angle B of between 30° and 80°, in particular of 30°, 35°, 40°, 45°, 50°, 55°, 60°, 65°, 70°, 75°, 80° between them and the longitudinal axis. The electromagnetic compatibility (EMC) of the drive circuit is also improved thereby.

The drive circuit comprises a sensor branch, which has in particular one, two or several Hall sensors for detecting drive parameters of the actuator. For example the rotational speed of the actuator or a rotational angle of the actuator can be detected by means of the sensors.

It is preferably provided that at least one contact tongue abuts directly on an electrically conductive actuator housing of the actuator so as to be pretensioned during operation of the actuator device, so as to establish an electrical contact between the drive circuit and the actuator housing. The contact tongue thus advantageously abuts directly on the actuator housing without superfluous space or gap.

The actuator of the actuator device advantageously has one or several actuator housing covers, which are arranged on the actuator housing of the actuator and which can each also be referred to as bearing shield. In any case, the actuator housing covers serve the purpose of quasi protecting the interior of the actuator against environmental influences. Each actuator housing cover is advantageously arranged on the actuator housing of the actuator in a releasable or non-releasable manner. It is preferably provided in particular that one or all actuator housing covers are quasi arranged integrally on the actuator housing of the actuator, so that a structural unit is formed.

A protrusion, which is, for example, a central protrusion, which is arranged centrally and centrically or eccentrically on an actuator housing cover and which comprises an actuator shaft guide-through for the guide-through of an actuator shaft or the like, can further be arranged on one or on each actuator housing cover. It is preferred in any case when, during operation of the actuator device, the actuator is arranged in the drive receiving space of the actuator device in such a way that the contact tongue abuts on the actuator housing cover or the central protrusion of the actuator housing cover in an electrically contacting and connecting manner. It should also be mentioned that the actuator housing and the actuator housing cover are made, for example, of a metal material and in particular of the same metal material.

It can further be provided that the contact tongue is bent at an angle, in particular completely or only partially, in the direction of an actuator insertion direction. The actuator insertion direction is defined, for example, by an assembly direction of the actuator. An assembly direction of the actuator is defined, for example, along and advantageously parallel to a main direction of extension of the drive receiving space.

The drive receiving space advantageously has an, in particular, round, oval or polygonal bottom surface, and a wall surface, which preferably protrudes orthogonally away from the bottom surface. The drive receiving space is advantageously open towards one side through an assembly opening, wherein the actuator can be inserted for example through the assembly opening. Along its main direction of expansion, the drive receiving space defines a drive receiving space longitudinal axis, relative to which the wall surface is oriented virtually parallel or parallel, and the bottom surface is oriented orthogonally. It is preferred in any case, when the above-described contact tongue is arranged in a abutting contact with the drive housing in a region of the wall surface, and thus relatively far away from the assembly opening, so that the contact tongue contacts the actuator in the vicinity of the bottom surface and thus relatively far away from the assembly opening.

In summary, it should be noted: The present invention relates to an actuator device for adjusting an actuator, in particular for a motor vehicle. The device comprises a housing comprising a support body, wherein the support body has a socket, which is formed integrally, in one piece, with the support body, for connection to a plug. The support body further has a drive receiving space for receiving an actuator and a gear receiving space for receiving an adjusting gear. An actuator for driving the adjusting element, and an adjusting gear are arranged in the receiving spaces. The actuator device further has a drive circuit for operating the actuator, wherein the drive circuit comprises electrically conductive conductor bodies, and comprises an interference suppression branch for reducing interferences, and advantageously a sensor branch for detecting drive parameters. At least one conductor body, which is referred to as contact tongue, and which abuts on an actuator housing of the actuator in a clamping manner during operation of the actuator device so as to establish an electrical contact between the drive circuit and the actuator housing, is arranged on the drive circuit, wherein the actuator housing serves as zero-ground potential or reference potential.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
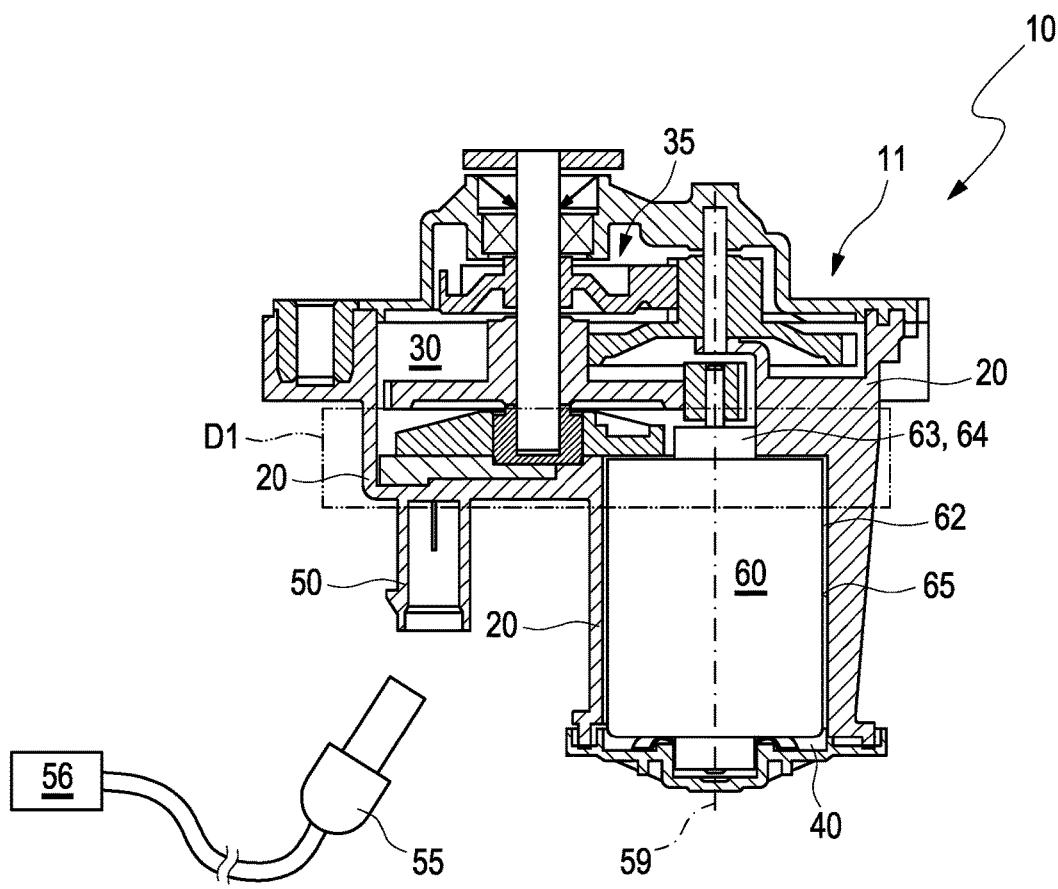
FIG. 1 shows a sectional view of an actuator device.
Figure 2:
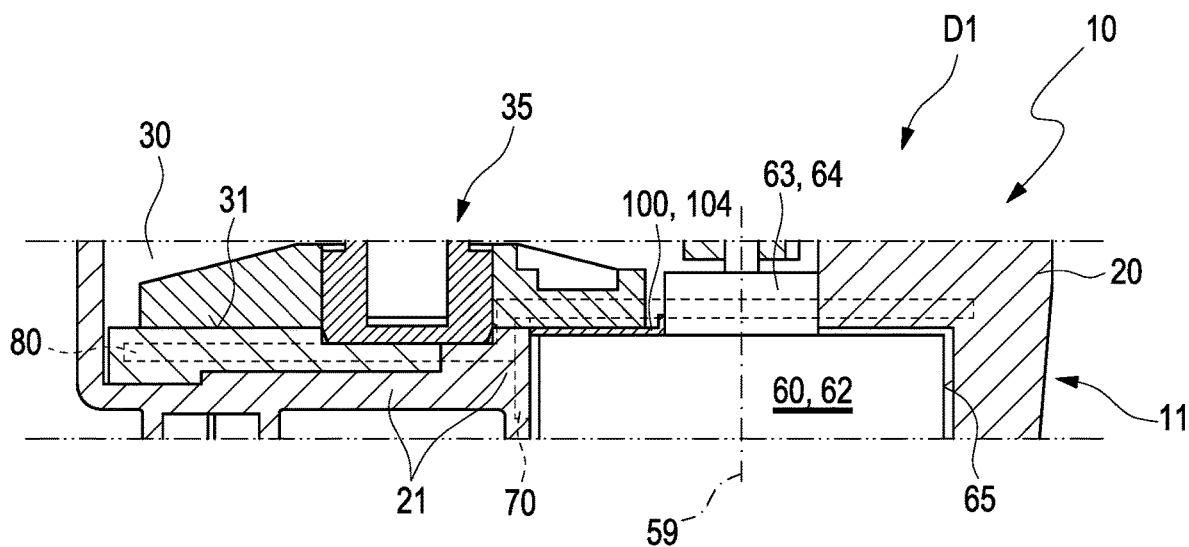
FIG. 2 shows a detail D1 of the actuator device according to FIG. 1.

An exemplary embodiment of an actuator device 10 is illustrated in the drawing, which serves to operate a non-illustrated adjusting element. Adjusting elements of this type are used in particular in the case of motor vehicles, for example in valves or for example in the case of wastegate, VTG or VIC boost pressure controls, in the case of exhaust flaps and acoustic flaps or also in the case of windshield wipers.

The actuator device 10 comprises an in particular multi-part housing 11, which has a support body 20, which is advantageously made of a plastic material. It is conceivable that the support body 20 is produced, for example, as part of an injection molding process.

In any case, the actuator device 10 furthermore comprises an actuator 60, an adjusting gear 35, and a drive circuit 80 for supplying and controlling the actuator 60.

The support body 20 has an actuator receiving space 40, which can advantageously be closed by means of a housing cover, which is not described in more detail, and a gear receiving space 30, which can likewise be closed by means of a housing cover, which is not described in more detail. The gear receiving space 30 has a jacket surface and a bottom-side equipping surface 31.

A socket 50 is furthermore arranged on the support body 20. Said socket is advantageously formed as integral part of the support body 20, thus quasi in one piece with the support body 20.

The socket 50 is advantageously made of a plastic material, in particular of the same plastic material, of which the support body 20 is made.

Based on a non-illustrated longitudinal axis of the socket 50, the socket 50 preferably has an, in particular thin-walled, hollow-cylindrical cross section. In the case of sockets in two rows, which are not illustrated in the drawing, the plug geometry can be arranged so as to be rotated 90° about a vertical axis by, so that the socket can quasi be engaged from one side.

In any case, the socket 50 is designed in such a way that a suggested plug 55 can be attached to it. The actuator 60 and the drive circuit 80 described further below can thus be connected to a supply device 56.

The supply device 56 provides in particular energy for the actuator. As an example, the supply device 56 can comprise evaluating means for sensors 78, 79.

The support body 20 advantageously has a dividing wall 21, which is arranged between the gear receiving space 30 and the actuator receiving space 40. The dividing wall 21 quasi separates the two receiving spaces 35, 40 from one another, so that no fluid exchange is possible between them.

As an example, the actuator 60 is a DC electric motor.

The virtually cylindrical actuator 60 extends along an actuator shaft longitudinal axis 59 and comprises an actuator housing 62 as well as a motor centering collar 63.

The actuator 60 provides a drive movement or a drive torque for an operation of the adjusting element of the actuator device 10, wherein the actuator 60 is firmly arranged in the drive receiving space 40 of the support body 20 in the operating state of the actuator device 10.

The actuator housing 62 is limited by a jacket surface in the radial direction and by two front surfaces, which are not identified in more detail, in the axial direction. The motor centering collar 63 is arranged at one of the two front surfaces.

The actuator 60 is advantageously inserted into the drive receiving space 40, leading with the front surface, which supports the motor centering collar 63. At the second front surface of the actuator 60, which is oriented opposite to the first front surface, a spring arrangement, for example a wave spring, is advantageously arranged, which is supported on the housing cover. The actuator 60 can be clamped to the support body 20 by means of said spring arrangement.

The actuator device 10 furthermore has the adjusting gear 35, which is arranged in the gear receiving space 30 of the support body 20. The adjusting gear 35 is advantageously coupled to the adjusting gear 60 on the drive side, and to the adjusting element on the output side. A drive torque provided by the actuator 60 during operation of the actuator device 10 or a drive movement is thereby adapted to the demands of the adjusting element.

The actuator device 10 furthermore has a heat sink 70, which is, for example, a cooling water duct. In FIG. 1, the heat sink 70 is suggested by a dashed rectangular box. It provides the advantage that the actuator 60 can be cooled during operation.

The actuator device 10 furthermore has the above-mentioned drive circuit 80. The latter serves in particular for supplying the actuator 60 with energy, which is provided by the supply device 56. Sensors 78, 79 can further be controlled with it. The drive circuit 80 could thus also be referred to as a sensor/control circuit.

The drive circuit 80 is advantageously arranged, quasi in the interior, of the dividing wall 21. It extends in particular from the socket 50 to the actuator receiving space 40. The drive circuit 80 is also illustrated by a body suggested by means of dashed lines.

Figure 3:
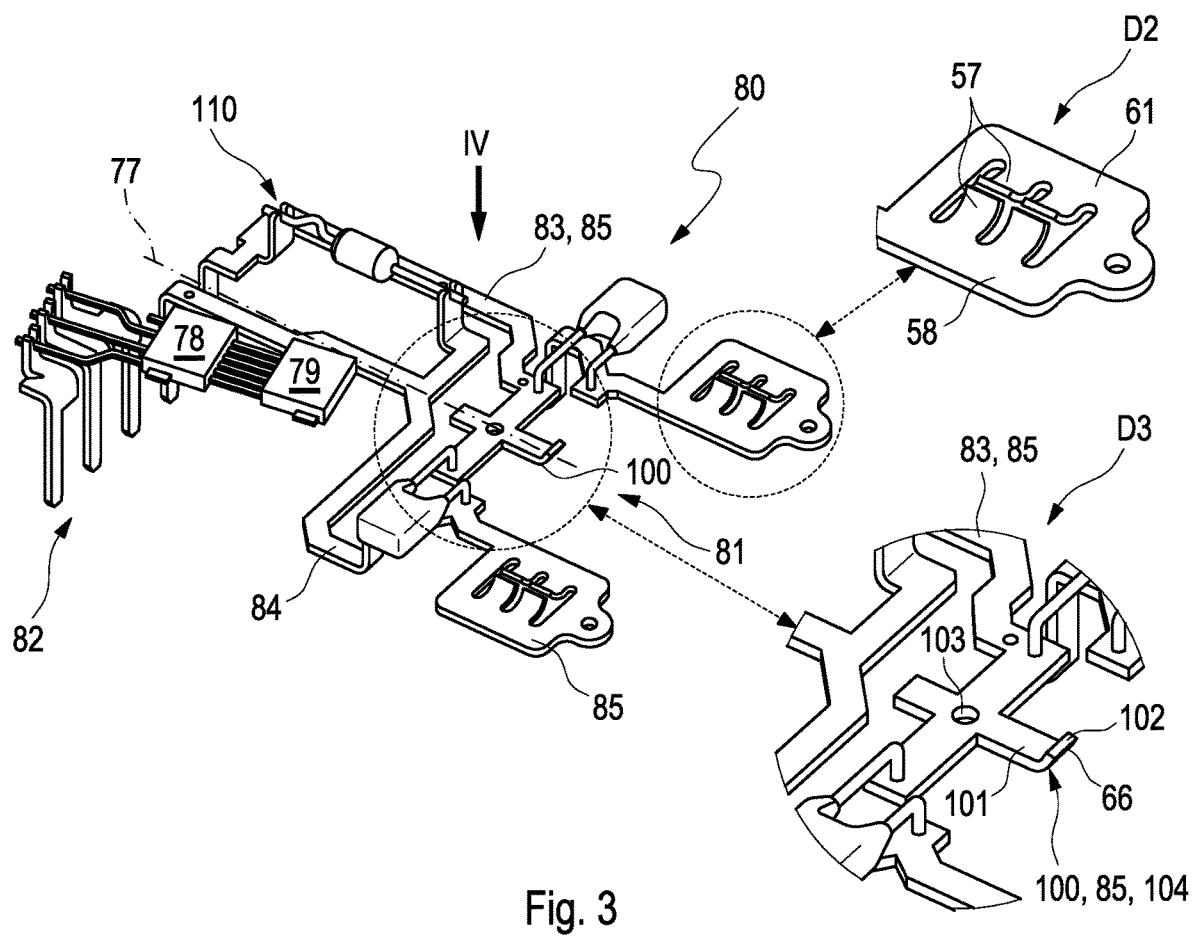
FIG. 3 shows a perspective view of the drive circuit as well as details D2 and D3 of the drive circuit.

A perspective view of the drive circuit 80 as well as details D2 and D3 can be seen in FIG. 3. A drive circuit 80 of this type is arranged, for example, in the support body 20 in the dividing wall 21.

The drive circuit 80 essentially has an interference suppression branch 81 and a sensor branch 82 comprising sensors 78, 79.

The interference suppression branch 81 serves for the interference suppression of the actuator 60 and comprises a first and a second electrical branch 83, 84. The conductor branches 83, 84 extend along a longitudinal axis 77, whereby they each comprise at least one conductor body 85.

The drive circuit 80 can have different electrical components. As an example, the interference suppression branch 81 comprises two capacitors. The drive circuit 80 optionally comprises a further capacitor.

In any case, the interference suppression branch 80 is divided into at least two imaginary conductor alignment sections 87, 88, which are aligned in the axial direction of an alignment direction 86, which is arranged parallel to the longitudinal axis 77. According to FIG. 5, a third conductor alignment section 89 is additionally illustrated in addition to the second conductor alignment section 88.

Figure 4:
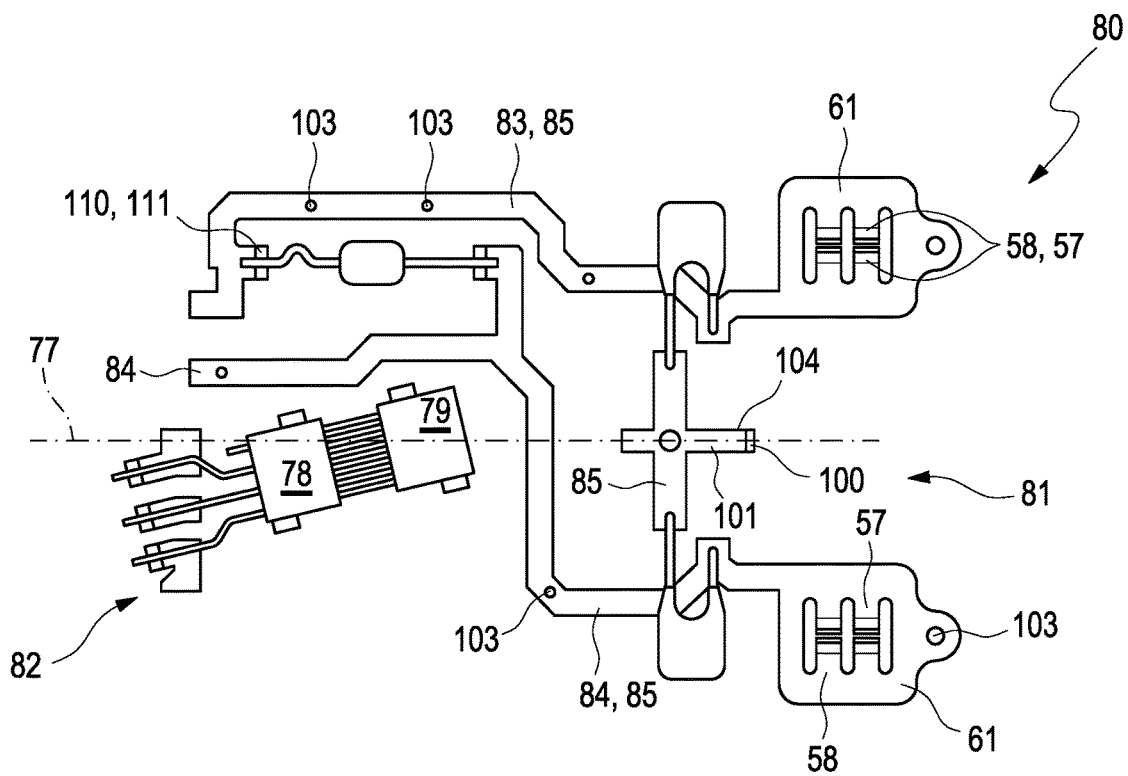
FIG. 4 shows the drive circuit from FIG. 3 in a top view according to arrow IV.

It can be seen according to FIGS. 4 and 5 that the conductor branches 83, 84 extend through the first conductor alignment section 87, through the conductor alignment section 88, and subsequently through the conductor alignment section 89.

Inside the first conductor alignment section 87, the conductor branches 83, 84 run obliquely towards one another in the direction of the alignment direction 86. They then advantageously lead into capacitor contact points 90, which are located, for example, on a boundary between the conductor alignments sections 87, 88 referred to as section boundary. The conductor branches 83, 84 quasi run towards the capacitor contact points 90. One capacitor of the interference suppression branch 80 is in each case arranged at two capacitor contact points 90.

Inside the second conductor alignment section 88, which follows the first conductor alignment section 87, the conductor branches 83, 84 run obliquely away from one another, thus apart from one another, in the alignment direction 86. The conductor branches 83, 84 quasi run from the capacitor contact points 90 in the direction of the actuator contact. Advantageously, they then lead into drive contacts of the actuator 60.

The conductor branches 83, 84 arranged in the third conductor alignment section 89 are arranged parallel to one another and/or parallel to the longitudinal axis 77. Advantageously, the conductor alignment section 89 is optional.

According to the drawing, the two illustrated conductor branches 83, 84 are arranged symmetrically to one another relative to the longitudinal axis 77. It is also conceivable that they are arranged symmetrically only in at least one of the conductor alignment sections 87, 88, 89.

Figure 5:
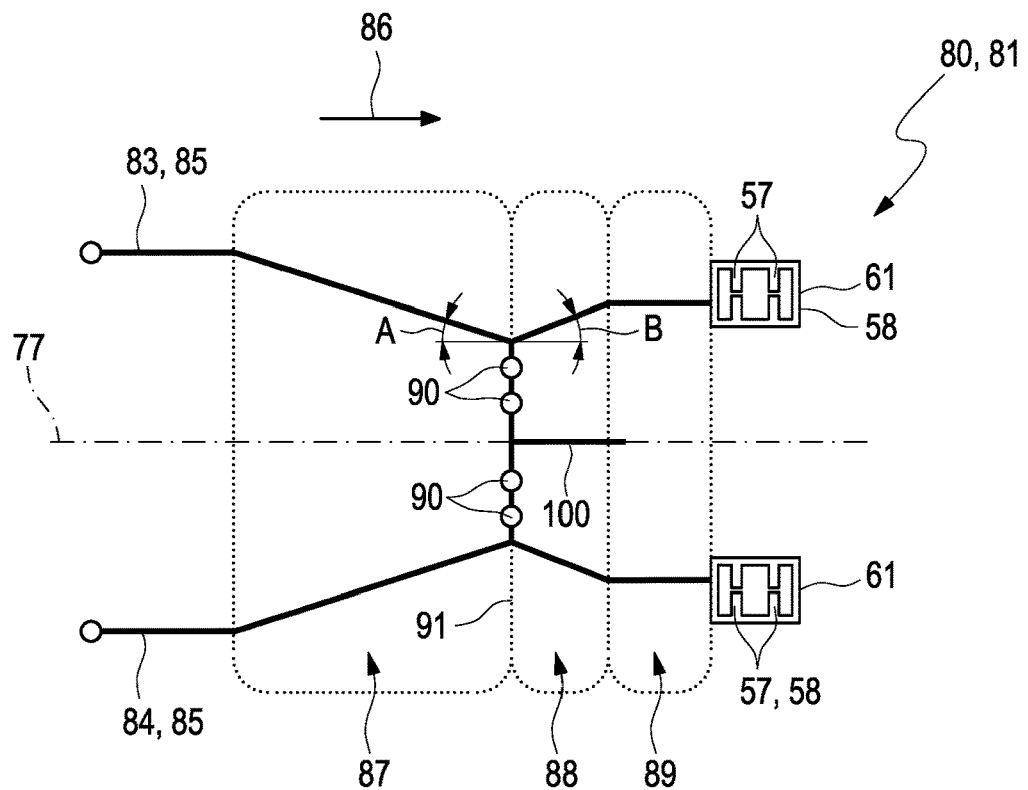
FIG. 5 shows a schematic drive circuit in a top view.

According to FIG. 5, the conductor branches 83, 84 inside the first conductor alignment section 87 each form an angle A between them and the longitudinal axis 77, which, as an example, is approximately 30°. Angles of between 30° and 80°, in particular of 30°, 35°, 40°, 45°, 50°, 55°, 60°, 65°, 70°, 75°, 80° are conceivable.

According to FIG. 5, the conductor branches 83, 84 inside the second conductor alignment section further each form an angle B between them and the longitudinal axis 77, which, as an example, is approximately 40°. Angles of between 30° and 80° are conceivable, in particular of 30°, 35°, 40°, 45°, 50°, 55°, 60°, 65°, 70°, 75°, 80°.

A contact tongue 100 is advantageously arranged at the interference suppression branch 80, which, according to the drawing, can be an integral part of the drive circuit 80. The contact tongue 100 is clamped to the actuator housing 62 during operation of the actuator device 10, which can be seen, for example, in detail D1. As an example, the contact tongue 100 contacts the actuator 60 in the region of the motor centering collar 63.

A drive contact 61 for the actuator 60 is illustrated in detail D2. Each drive contact 61 advantageously has a pair of spring bodies 58 for contacting the actuator 60. Each spring body 58 is thereby advantageously arranged integrally on a conductor body 85 of the drive circuit 80. Each spring body 58 can have one or several elastic spring protrusions 57 for contacting the actuator 60. The spring protrusions 57 are arranged, for example, in a web-like manner, on the spring body 58, and advantageously protrude into an opening, in particular into a polygonal opening or into an oval opening or into a circular opening or into an annular opening of the spring body 58.

According to detail D3, the contact tongue 100 is bent and has a rectangular cross section along its longitudinal body axis as well as across a rectangular front surface.

As an example, the contact tongue 100 is embodied as flat body 104. The flat body 104 is in particular of a cuboid design.

The contact tongue 100 has a first tongue segment 101 and a second tongue segment 102, wherein the second tongue segment 102 is arranged at an angle relative to the first tongue segment 101.

It is not illustrated that the contact tongue 100 has at least one groove-forming groove edge, which is oriented in the direction of the actuator 60, so as to improve or establish the electrical contact.

The conductor bodies 85 of the drive circuit 80 have several positioning recesses 103, which engage with non-illustrated positioning pins, which are arranged on the support body 20, so as to arrange them at a predetermined position relative to the support body 20 and so as to fix them transversely to and along a non-illustrated positioning pin longitudinal axis.

Figure 6:
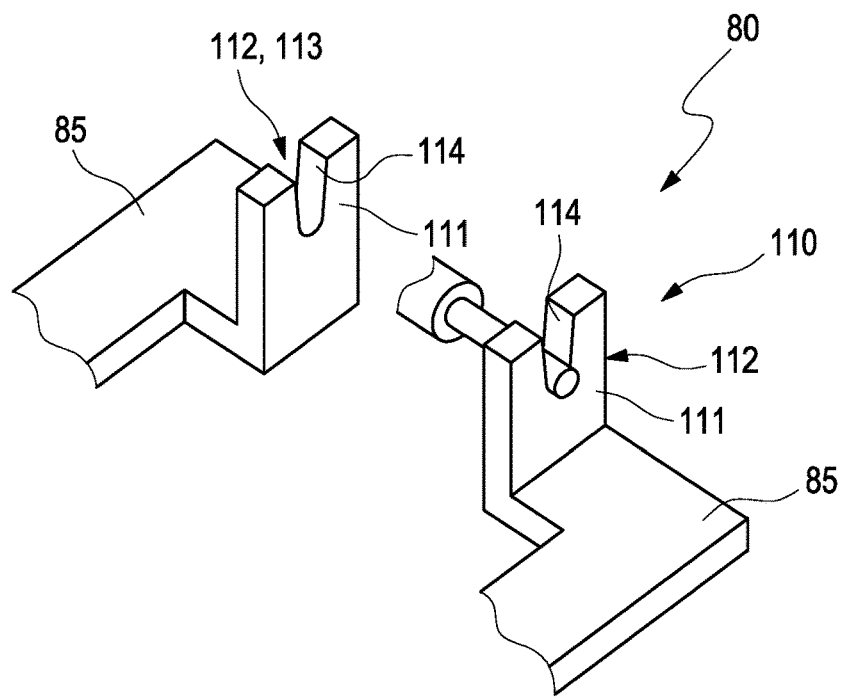
FIG. 6 shows a perspective view of a holding device.

A holding device 110 can be seen in FIG. 6, which serves for holding electrical components. As an example, an electrical component is suggested, which is held and fixed in the holding device 110.

Holding devices 110 are advantageously integral part of the conductor bodies 85 of the drive circuit 80, thus quasi arranged thereon in one piece. It is conceivable that the holding devices 110 are produced together with the conductor bodies 85 in a stamping process, for example of a non-illustrated stamped grid.

In any case, a holding device 110 advantageously has a pair of holding bodies 111, which jointly supports and fixes an electrical component. The holding bodies 111 form a component receptacle identified with 112 for supporting a connecting section of an electrical component. The component receptacle 112 thereby has a receiving opening 113 for the guide-through of the connecting section.

Each holding body 111 comprises an, in particular C-shaped, V-shaped or key hole-shaped support bed 114, which serves for placing and fixing a connecting section.

The invention claimed is:

1. An actuator device for adjusting an adjusting element, comprising:
   a housing including a support body composed of a plastic material, the support body including a drive receiving space and a gear receiving space, the gear receiving space configured to receive an adjusting gear;
   an actuator arranged in the drive receiving space for driving the adjusting element, the actuator including (i) a plurality of drive contacts and (ii) an actuator housing that is electrically conductive;
   a drive circuit for operating the actuator;
   the drive circuit including a plurality of conductor bodies that are electrically conductive for contacting the plurality of drive contacts of the actuator, for contacting a plurality of components of the drive circuit, and for contacting a supply device;
   the drive circuit including an interference suppression branch configured to reduce at least one of electrical interferences and electromagnetic interferences;
   wherein at least one conductor body of the plurality of conductor bodies is structured as a contact tongue and abuts on the actuator housing in a pretensioned manner during operation establishing an electrical contact between the drive circuit and the actuator housing; and
   wherein the actuator housing is configured as at least one of a zero-ground potential and a reference potential.

2. The actuator device according to claim 1, wherein:
   the contact tongue is structured as a flat body and is bent in a prong-like manner;
   the contact tongue has a longitudinal body axis; and
   the contact tongue has at least one of a triangular, a rectangular, and a polygonal cross section relative to the longitudinal body axis.

3. The actuator device according to claim 1, wherein:
   the contact tongue includes a first tongue segment and a second tongue segment; and
   the second tongue segment is arranged transversely to the first tongue segment such that the first tongue segment and the second tongue segment define an angle of 90° to 170° therebetween.

4. The actuator device according to claim 1, wherein:
   the contact tongue includes at least one groove edge oriented in a direction of the actuator for at least one of forming grooves in, carving into, and scratching open a housing surface of the actuator housing; and
   the contact tongue is pretensioned elastically against the actuator housing such that the at least one groove edge of the contact tongue cuts into the housing surface of the actuator housing establishing an electrical contact between the contact tongue and the actuator housing.

5. The actuator device according to claim 1, wherein the contact tongue is bendable in a spring-like manner and pushes against the actuator housing during operation under pretension and pretensions the actuator housing against the support body.

6. The actuator device according to claim 1, wherein at least one of:
the contact tongue is arranged in the interference suppression branch to provide at least one of (i) a zero-ground contact for interference suppression and (ii) a reference potential for signal and operating voltages; and
the contact tongue contacts the actuator housing in a region of a plurality of DC motor brushes of the actuator.

7. The actuator device according to claim 1, wherein:
the drive circuit is arranged at least partially in an interior of a dividing wall of the support body; and
the dividing wall separates the drive receiving space and the gear receiving space from one another.

8. The actuator device according to claim 7, wherein at least one connecting section of the drive circuit, an actuator-side drive supply section of the drive circuit, at least one holding device of the drive circuit for holding at least one electrical component, and the contact tongue are arranged outside of the dividing wall.

9. The actuator device according to claim 7, wherein the drive circuit is arranged between a heat sink for cooling the actuator and the gear receiving space such that at least one of the drive circuit and the actuator is coolable during operation of the actuator device.

10. The actuator device according to claim 1, wherein:
the plurality of conductor bodies include at least one integral holding device structured to hold at least one electrical component; and
the at least one holding device includes a pair of holding bodies that jointly support and fix the at least one electrical component.

11. The actuator device according to claim 10, wherein:
the at least one holding body includes a component receptacle configured to support a connecting section of the at least one electrical component;
the component receptacle has a receiving opening configured to facilitate a guide-through of the connecting section; and
the component receptacle includes a C-shaped support bed structured and arranged to facilitate proper arrangement and fixing of the connecting section.

12. The actuator device according to claim 1, wherein:
the drive circuit is structured as a stamped grid that is arranged in the gear receiving space;
the stamped grid includes the plurality of conductor bodies and a plurality of connecting elements connecting the plurality of conductor bodies to one another;
the stamped grid further includes a plurality of positioning recesses; and
the support body includes a plurality of positioning pins that engage the plurality of positioning recesses to facilitate arrangement of the stamped grid at a predetermined position relative to the support body and to fix the stamped grid transversely to and along a positioning pin longitudinal axis.

13. The actuator device according to claim 1, wherein:
the interference suppression branch includes two conductor branches that extend along a longitudinal axis and that each include at least one conductor body of the plurality of conductor bodies;
the interference suppression branch is divided into at least two imaginary conductor alignment sections that are disposed in a row in a direction of the longitudinal axis and through which the two conductor branches extend;
the two conductor branches are arranged inside a first conductor alignment section of the at least two conductor alignment sections and extend obliquely towards one another; and
the two conductor branches are arranged inside a second conductor alignment section of the at least two conductor alignment sections, which follows the first conductor alignment section, and extend obliquely away from one another and lead into the plurality of drive contacts of the actuator.

14. The actuator device according to claim 13, wherein:
a third conductor alignment section of the at least two imaginary conductor alignment sections is arranged between the second conductor alignment section and the plurality of drive contacts relative to the direction of the longitudinal axis; and
inside the third conductor alignment section, the two conductor branches extend at least one of (i) parallel to one another and (ii) parallel to the longitudinal axis.

15. The actuator device according to claim 13, wherein:
at least two capacitor contact points are arranged at least one of at and on an imaginary section boundary disposed between the first conductor alignment section and the second conductor alignment section; and
the two conductor branches extend into the at least two capacitor contact points obliquely relative to the longitudinal axis.

16. The actuator device according to claim 15, wherein the two conductor branches are arranged inside the first conductor alignment section to point in a direction of the at least two capacitor contact points.

17. The actuator device according to claim 15, wherein the two conductor branches are arranged inside the second conductor alignment section to point from the two capacitor contact points in a direction of the plurality of drive contacts of the actuator.

18. The actuator device according to claim 13, wherein the two conductor branches are arranged symmetrical to one another relative to the longitudinal axis in at least one of the at least two imaginary conductor alignment sections.

19. The actuator device according to claim 13, wherein at least one conductor branch of the two conductor branches is arranged inside the first conductor alignment section such that an angle of 30° to 80° is defined between the at least one conductor branch and the longitudinal axis.

20. The actuator device according to claim 13, wherein at least one conductor branch of the two conductor branches is arranged inside the second conductor alignment section such that an angle of 30° to 80° is defined between the at least one conductor branch and the longitudinal axis.

21. The actuator device according to claim 1, wherein the interference suppression branch includes at least one of:
at least one electromagnetic compatibility circuit; and
at least one capacitor.

22. A manufacturing method for producing a drive circuit of an actuator device, the actuator device including a housing including a support body composed of a plastic material, the support body including an integrally formed socket for connection to a plug of a supply device, the support body further including a drive receiving space and a gear receiving space, the gear receiving space configured to receive an adjusting gear, the actuator device further including an actuator arranged in the drive receiving space for driving an adjusting element and a drive circuit arranged in the gear receiving space for operating the actuator, the actuator including (i) a plurality of drive contacts and (ii) an actuator housing that is electrically conductive, the drive circuit structured as a stamped gird and including a plurality of conductor bodies that are electrically conductive for contacting the plurality of drive contacts of the actuator, for contacting a plurality of electrical components of the drive circuit, and for contacting the socket, the method comprising:

inserting the stamped grid into the gear receiving space through a gear receiving opening of the gear receiving space, the stamped grid including (i) an interference suppression branch configured to reduce at least one of electrical interferences and electromagnetic interferences and (ii) a plurality of connecting elements connecting the plurality of conductor bodies to one another, at least one conductor body of the plurality of conductor bodies structured as a contact tongue;

arranging the stamped grid at a predetermined position relative to the support body via placing the stamped grid onto a bottom-side equipping surface of the gear receiving space and engaging a plurality of positioning pins arranged on the support body with a plurality of positioning recesses of the stamped grid such that the stamped grid is fixed transversely to and along a positioning pin longitudinal axis;

extrusion coating the stamped grid with a plastic material via a plastic injection molding process such that the drive circuit is at least partially covered with the plastic material and a portion of the drive circuit is arranged in the interior of a dividing wall of the support body;

equipping the stamped grid with a plurality of electrical components via holding and fixing the plurality of electrical components with a plurality of holding devices arranged on the plurality of conductor bodies;

providing the drive circuit via connecting the plurality of electrical components to the stamped grid with a substance-to-substance bond, cutting the plurality of connecting elements of the stamped grid via laser welding, and passing a laser beam for laser welding through the gear receiving opening;

inserting and fastening the actuator and the adjusting gear in the drive receiving space and the gear receiving space, respectively;

elastically bending the contact tongue and pretensioning the contact tongue against the actuator housing via inserting the actuator into the drive receiving space;

at least one of (i) carving into the actuator housing with the contact tongue and (ii) scratching open the actuator housing with the contact tongue, via pretensioning the contact tongue against the actuator housing;

establishing electrical contact between the drive circuit and the actuator housing via the at least one of (i) carving into the actuator housing with the contact tongue and (ii) scratching open the actuator housing with the contact tongue; and wherein the actuator housing is configured as at least one of a zero-ground potential and a reference potential.

23. An actuator device for adjusting an adjusting element, comprising:

a housing including a support body composed of a plastic material, the support body including a drive receiving space and a gear receiving space, the gear receiving space configured to receive an adjusting gear;

an actuator arranged in the drive receiving space for driving the adjusting element, the actuator including a plurality of drive contacts;

a drive circuit for operating the actuator;

the drive circuit including a plurality of electrically conductive conductor bodies for contacting the plurality of drive contacts of the actuator, for contacting a plurality of components of the drive circuit, and for contacting a supply device;

the drive circuit including an interference suppression branch configured to reduce interferences;

wherein at least one conductor body of the plurality of conductor bodies is structured as a contact tongue, is arranged on the drive circuit, and abuts on an electrically conductive actuator housing of the actuator in a pretensioned manner during operation establishing an electrical contact between the drive circuit and the actuator housing;

wherein the actuator housing is configured as at least one of a zero-ground potential and a reference potential;

wherein the drive circuit is structured as a stamped grid that is arranged in the gear receiving space;

wherein the stamped grid includes the plurality of conductor bodies and a plurality of connecting elements connecting the plurality of conductor bodies to one another;

wherein the stamped grid further includes a plurality of positioning recesses; and wherein the support body includes a plurality of positioning pins that engage the plurality of positioning recesses to facilitate arrangement of the stamped grid at a predetermined position relative to the support body and to fix the stamped grid transversely to and along a positioning pin longitudinal axis.

\* \* \* \* \*